(12) United States Patent
Liang

(10) Patent No.: US 8,411,464 B2
(45) Date of Patent: Apr. 2, 2013

(54) PORTABLE ELECTRONIC DEVICE WITH ROTATABLE COVER

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 284 days.

(21) Appl. No.: 12/978,613

(22) Filed: Dec. 26, 2010

(65) Prior Publication Data
US 2011/0292576 A1   Dec. 1, 2011

(30) Foreign Application Priority Data

May 31, 2010   (CN) .......................... 2010 1 0187341

(51) Int. Cl.
*H05K 5/00* (2006.01)
(52) U.S. Cl. .................. 361/814; 455/575.1; 455/575.3; 455/575.4

(58) Field of Classification Search ................... 361/814; 455/575.1, 575.3, 575.4
See application file for complete search history.

(56) References Cited

U.S. PATENT DOCUMENTS 7,925,313 B2 *   4/2011   Kajihara et al. ........... 455/575.1

* cited by examiner

*Primary Examiner* — Tuan T Dinh
*Assistant Examiner* — Hung Dang
(74) *Attorney, Agent, or Firm* — Altis Law Group, Inc.

(57) ABSTRACT

A portable electronic device includes a base, a cove, a first plate, a second plate, a first post, a second post, and an adjusting mechanism. The first plate is secured to the cover. A guiding slot and a receiving hole are defined in the first plate. The second plate is secured to the base. A receiving slot and a pin hole are defined in the second plate. The first post passes through the pin hole and the receiving hole. The second post passes through the receiving slot and is slidably received in the guiding slot. One end of the adjusting mechanism is rotatably connected to the first and second plates by the first post, and the other end of the adjusting mechanism is slidably connected to the first and second plates by the second post.

18 Claims, 8 Drawing Sheets

PORTABLE ELECTRONIC DEVICE WITH ROTATABLE COVER

BACKGROUND

1. Technical Field

The disclosure relates to portable electronic devices, especially to a connecting assembly and a portable electronic device with a rotatable cover utilizing the connecting assembly.

2. Description of Related Art

Portable electronic devices, such as mobile phones, and notebooks, often have a base and a cover with a display. A portable electronic device includes a base and a cover, which longitudinally slides relative to the base. When the portable electronic device is used to play a game or see a movie, the display is usually rotated 90 degrees to have a better view. However, when the device is in such a configuration, it can be inconvenient to use buttons formed on the base.

Therefore, there is room for improvement within the art.

BRIEF DESCRIPTION OF THE DRAWINGS

Many aspects of the exemplary embodiment of a portable electronic device can be better understood with reference to the following drawings. The components in the drawings are not necessarily drawn to scale, the emphasis instead being placed upon clearly illustrating the principles of the portable electronic device. Moreover, in the drawings, like reference numerals designate corresponding parts throughout the several views, in which.

DETAILED DESCRIPTION

The disclosure is illustrated by way of example and not by way of limitation in the accompanying drawings. It should be noted that references to "an" or "one" embodiment in this disclosure are not necessarily to the same embodiment, and such references can include the meaning of "at least one" embodiment where the context permits.

Figure 1:
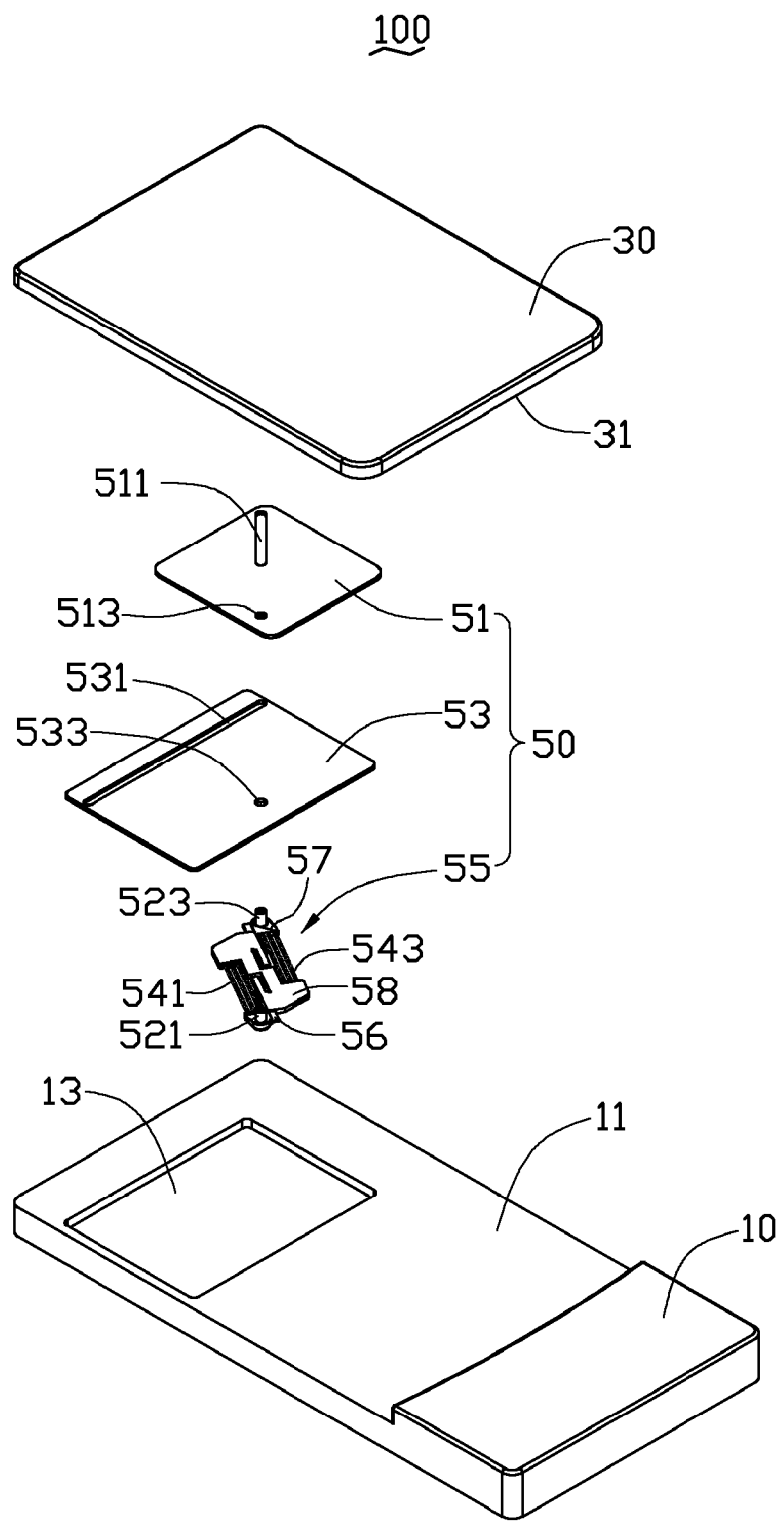
FIG. 1 is an exploded, isometric view of a portable electronic device.

FIG. 1 illustrates a portable electronic device 100. The portable electronic device 100 includes a base 10, a cover 30 with a display (not shown), and a connecting assembly 50. The connecting assembly 50 rotatably mounts the cover 30 on the base 10. The base 10 includes a surface 11, a keypad (not shown) may be embedded in the surface 11. The connecting assembly 50 includes a first plate 51, a first post 521, a second post 523, a second plate 53, and an adjusting mechanism 55. The first plate 51 is secured to the base 10, and the second plate 53 is secured to the cover 30. The first post 521 is rotatably attached to the first and second plates 51 and 53, and the second post 523 is slidably attached to the first and second plates 51 and 53. The adjusting mechanism 55 can be compressed or decompressed to generate torsion to allow the portable electronic device 100 stay open or closed.

Figure 2:
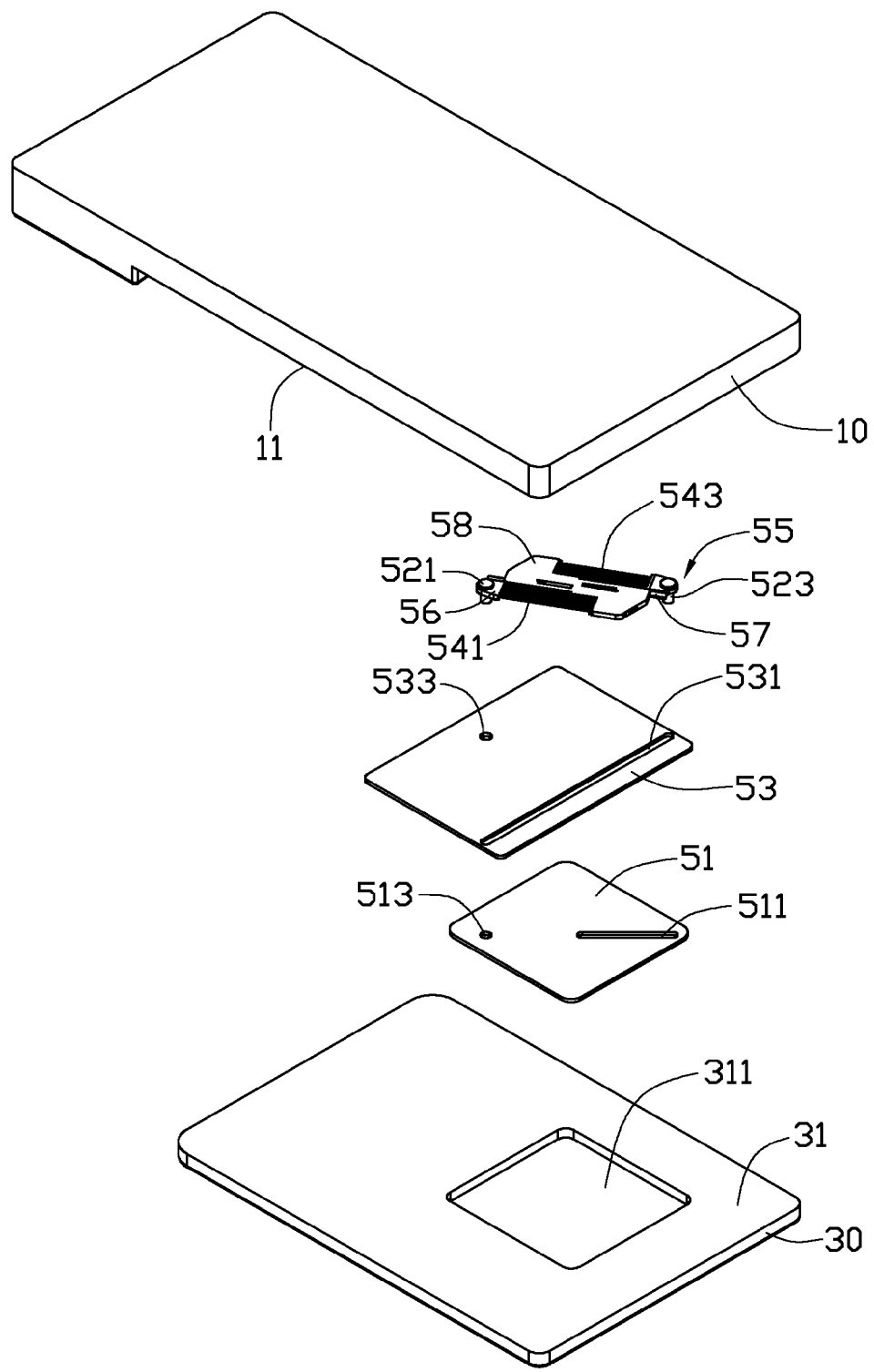
FIG. 2 is similar to FIG. 1, but viewing the portable electronic device from another aspect.

A first receiving cavity 311 is defined in the cover 30, in which the first plate 51 is received, as shown in FIG. 2. A second receiving cavity 13 is defined in the base 10, in which the second plate 53 is received, as shown in FIG. 1.

In the exemplary embodiment, the first and second plates 51 and 53 are both substantially rectangular. A guiding slot 511 is defined in the first plate 51, the guiding slot 511 and is oriented along the diagonal of the first plate 51. A receiving hole 513 is defined in one corner of the first plate 51. The guiding slot 511 and the receiving hole 513 are co-linear. A receiving slot 531 and a pin hole 533 are defined in the second plate 53. The three points including opposite ends of the 531 and the 533 form the vertices of an imaginary isosceles right triangle. The first post 521 includes a shaft portion 5211 and a flange portion 5213. The shaft portion 5211 passes through the pin hole 533 and is rotatably received in the receiving hole 511. The second post 523 includes a shaft portion 5231 and a flange portion 5233. The shaft portion 5231 passes through the receiving slot 531 and is slidably received in the guiding slot 513.

Figure 3:
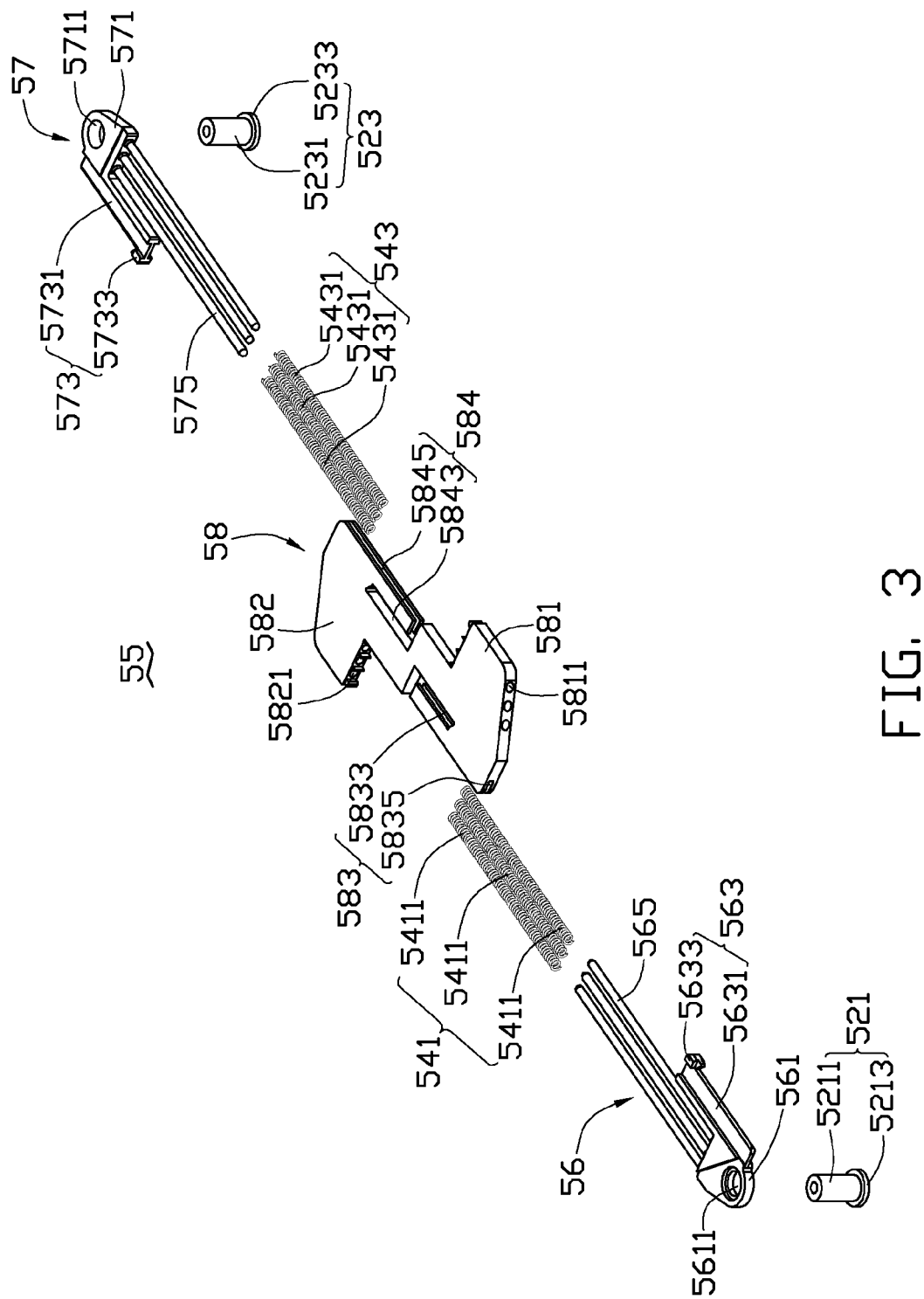
FIG. 3 is an exploded, isometric view of a connecting assembly of FIG. 1.

Referring to FIG. 3, the adjusting mechanism 55 includes a first elastic module 541, a second elastic module 543, a first resisting element 56, a second resisting element 57, and a connecting element 58. The first resisting element 56 and the second resisting element 57 are slidably attached to opposite ends of the connecting element 58 at opposite sides. The first elastic module 541 is placed around the first resisting element 541 and is for elastically resisting the connecting element 58. The second elastic module 543 is placed around the second resisting element 57 and is for elastically resisting the connecting element 58. The first elastic module 541 includes a number of springs 5411. The second elastic module 543 also includes a number of springs 5431.

The first resisting element 56 includes an end portion 561, a guiding portion 563 oriented at one side of the end portion 561, and a number of guiding rods 565 extending from the end portion 561 and parallel to the guiding portion 563. A through hole 5611 is defined in the end portion 561, through which the shaft portion 5211 of the first post 521 passes. The guiding portion 563 includes a plate portion 5631 and a guiding block 5633. The plate portion 5631 extends from one side of the end portion 561 and is parallel to the guiding rods 565. The guiding block 5633 projects from one side of the plate portion 5631 opposite to the end portion 561, the first resisting element 56 is retained in the connecting element 58. In this exemplary embodiment, the guiding rods 565 are parallel to each other, and each spring 5411 is placed around the corresponding guiding rod 565.

The second resisting element 57 is substantially the same as the first resisting element 56. The second resisting element 57 includes an end portion 571, a guiding portion 573, and a number of guiding rods 575. A through hole 5711 is defined in the end portion 571, through which the shaft portion 5231 of the second post 523 passes. The guiding portion 573 includes a plate portion 5731 and a guiding block 5733. The guiding block 5733 is for retaining the second resisting element 57 in the connecting element 58. Each spring 5431 is placed around the corresponding guiding rod 575.

The connecting element 58 includes a first plate portion 581 and a second plate portion 583 opposite to the first plate portion 581. Three spaced apart receiving grooves 5811 are defined in one side of the first plate portion 581. The guiding rods 575 of the second resisting element 57 are respectively received in the corresponding receiving grooves 5811. A receiving space 5833 and a number of sliding slots 5835 are defined in the other side of the first plate portion 581. The receiving space 5833 is generally L-shape and communicates with the sliding slot 5835. A short leg of the receiving space 5833 forms an entrance to allow the guiding block 5633 to pass thereby, a long leg of the receiving space 5833 substantially parallel to the first part forms a slot to allow the plate portion 5631 of the first resisting element 56 to slide therein. The sliding slot 5835 runs through the first plate portion 581 in which the plate portion 5733 of the second resisting element 57 is received.

The second plate portion 582 is similar to the first plate portion 581. Three spaced apart receiving grooves 5821 are defined in the second plate portion 582 at the same side with the receiving space 5833. A receiving space 5843 and a sliding slot 5845 are defined in the second plate portion 582 opposite to the receiving grooves 5821.

Referring to FIGS. 2 and 3, during assembly, each of the springs 5411 is respectively placed around the corresponding guiding rods 565 of the first resisting element 56. Then a free end of each guiding rod 565 is inserted into the corresponding receiving groove 5821 of the second plate portion 582. The first resisting element 56 is pushed to compress the first elastic module 541 until the guiding block 5633 aligns with the entrance of the receiving space 5833, and the guiding block 5633 passes by and is inserted into the slot of the receiving space 5833. Similarly, the second resisting element 57 is attached to the connecting element 58.

The shaft portion 5211 of the post 52 extends through the through hole 5611 of the first resisting element 56, the pin hole 533 of the second plate 53, and the receiving hole 511. A nut (not shown) can further retain the free end of the shaft portion 5211. Similarly, the second post 53 is attached to the adjusting mechanism 55 and is slidably received in the receiving slot 531 and the guiding slot 511. Thus, the connecting assembly 50 is assembled, as shown in FIG. 4.

Figure 7:
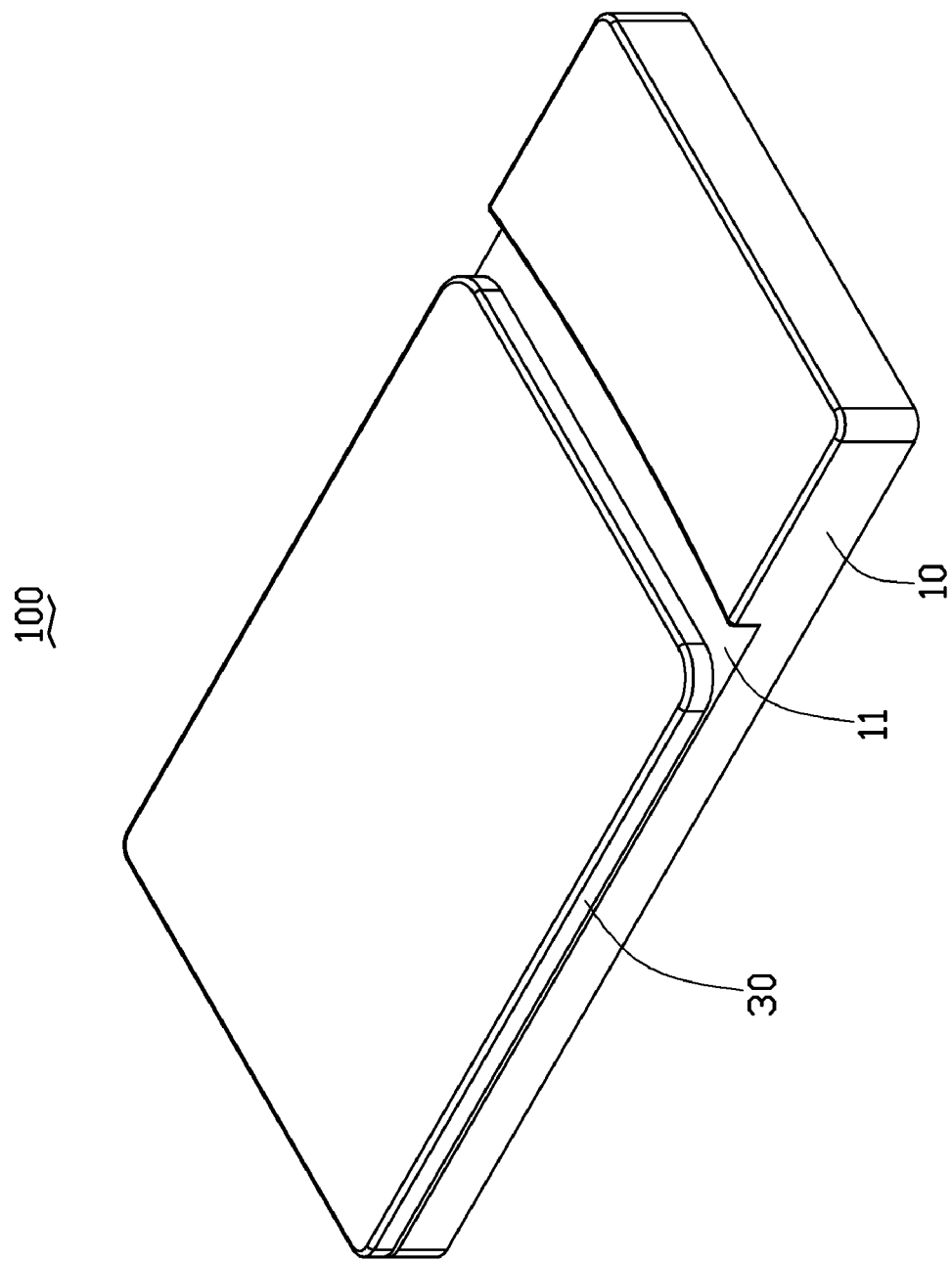
FIG. 7 is an assembled, isometric view of the portable electronic device of FIG. 1.

The first plate 51 is received in the first receiving cavity 311 of the cover 30 and is fixed to the cover 30 by means of glue or a fastener (not shown). The adjusting mechanism 55 and the second plate 53 are received in the second receiving cavity 13 of the base 10, and the second plate 53 are fixed to the base 10 by means of sonic welding or a fastener (not shown). The portable electronic device 100 is assembled, as shown in FIG. 7.

Figure 4:
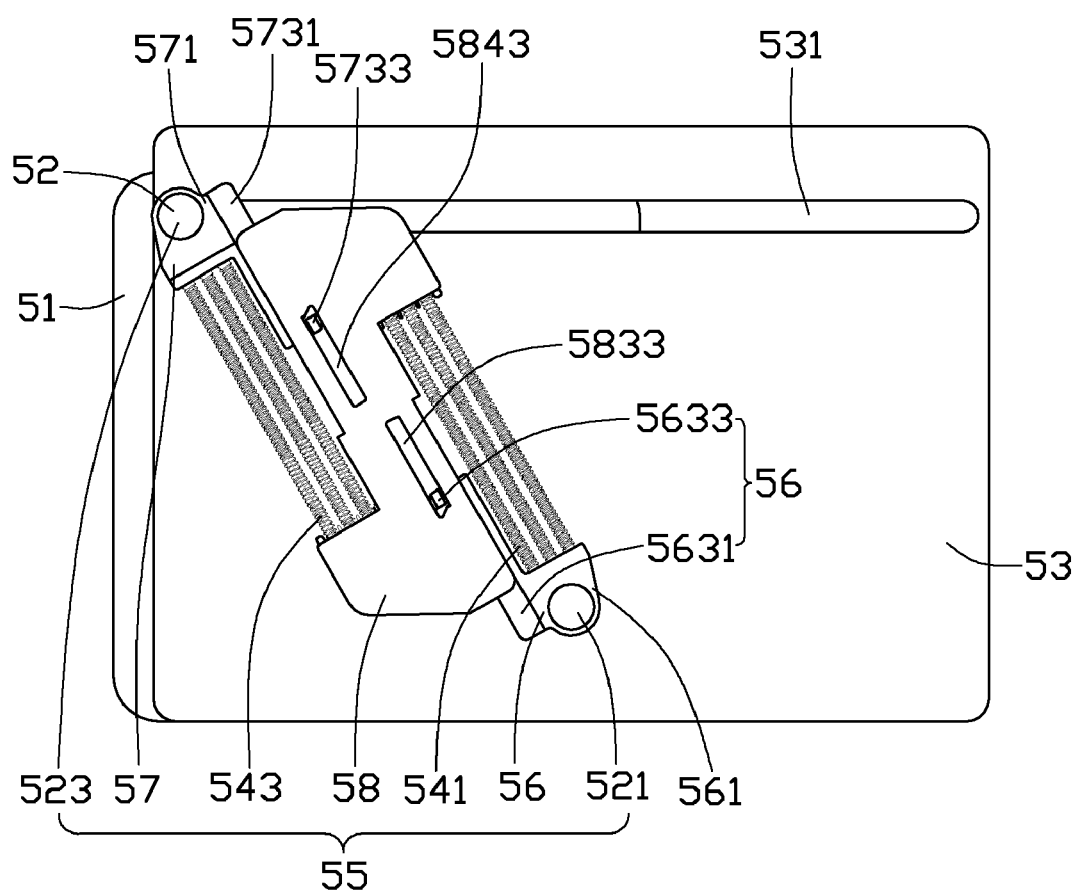
FIG. 4 is an assembled, isometric view of the connecting assembly in a first state.
Figure 5:
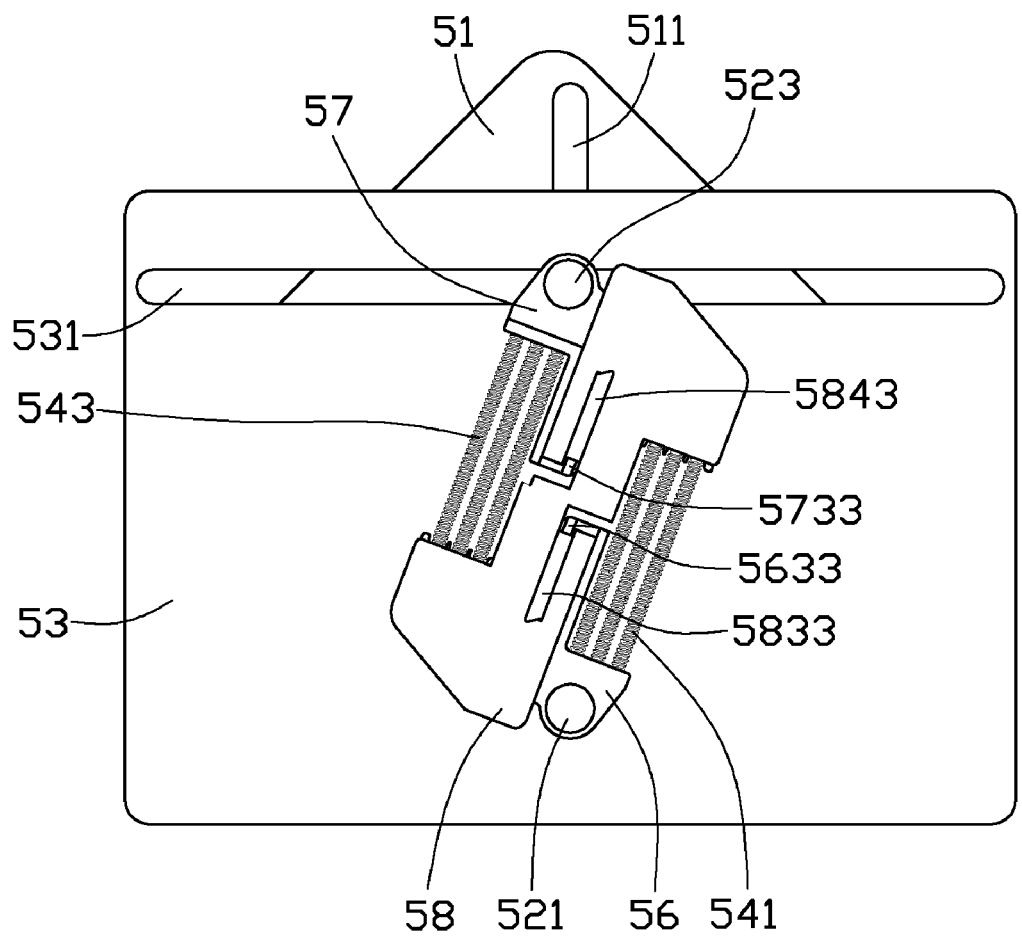
FIG. 5 is similar to FIG. 4, but showing the connecting assembly in a second state.
Figure 6:
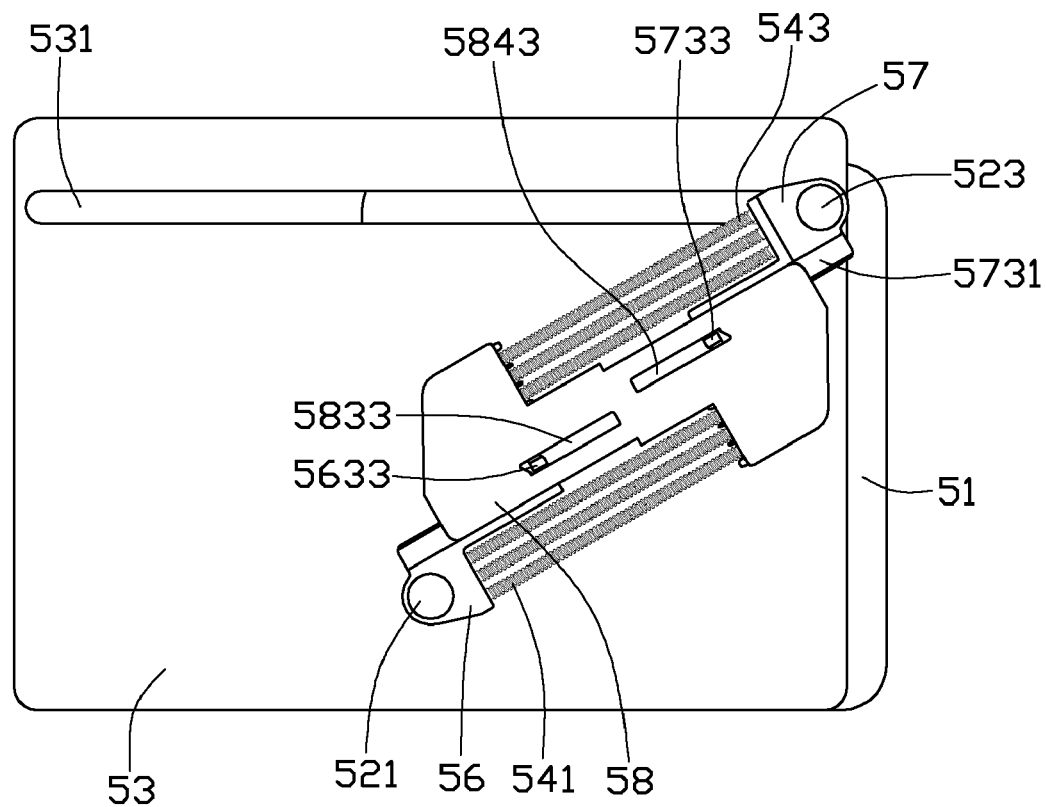
FIG. 6 is similar to FIG. 5, but showing the connecting assembly in another state.

Referring to FIGS. 4 through 6 to rotate the cover 30 relative to the base 10, the cover 30 is rotated by a user. The first plate 51 is rotated together with the cover 30, and the second post 523 is forced to slide along the guiding slot 511 and the receiving slot 531. The adjusting mechanism 55 the end portion 571 of the second resisting element 57 move along the receiving slot 531 and the guiding block 5733 slides along the second part of the receiving space 5843. The second resisting element 57 pushes the second plate portion 582 of the connecting element 58 to rotate, and the first elastic module 541 is compressed to accumulate energy. When the connecting element 58 rotates, the end portion 561 of the first resisting element 56 is driven to rotate about the first post 521. Under the elastic force of the first elastic module 541, the connecting element 58 moves towards the first post 521 and compress the second elastic module 543.

When the cover 30 is further rotated, the second post 523 slides to the middle of the receiving slot 531, as shown in FIG. 5. In this state, the first elastic module 541 and the second elastic module 541 are fully compressed.

Figure 8:
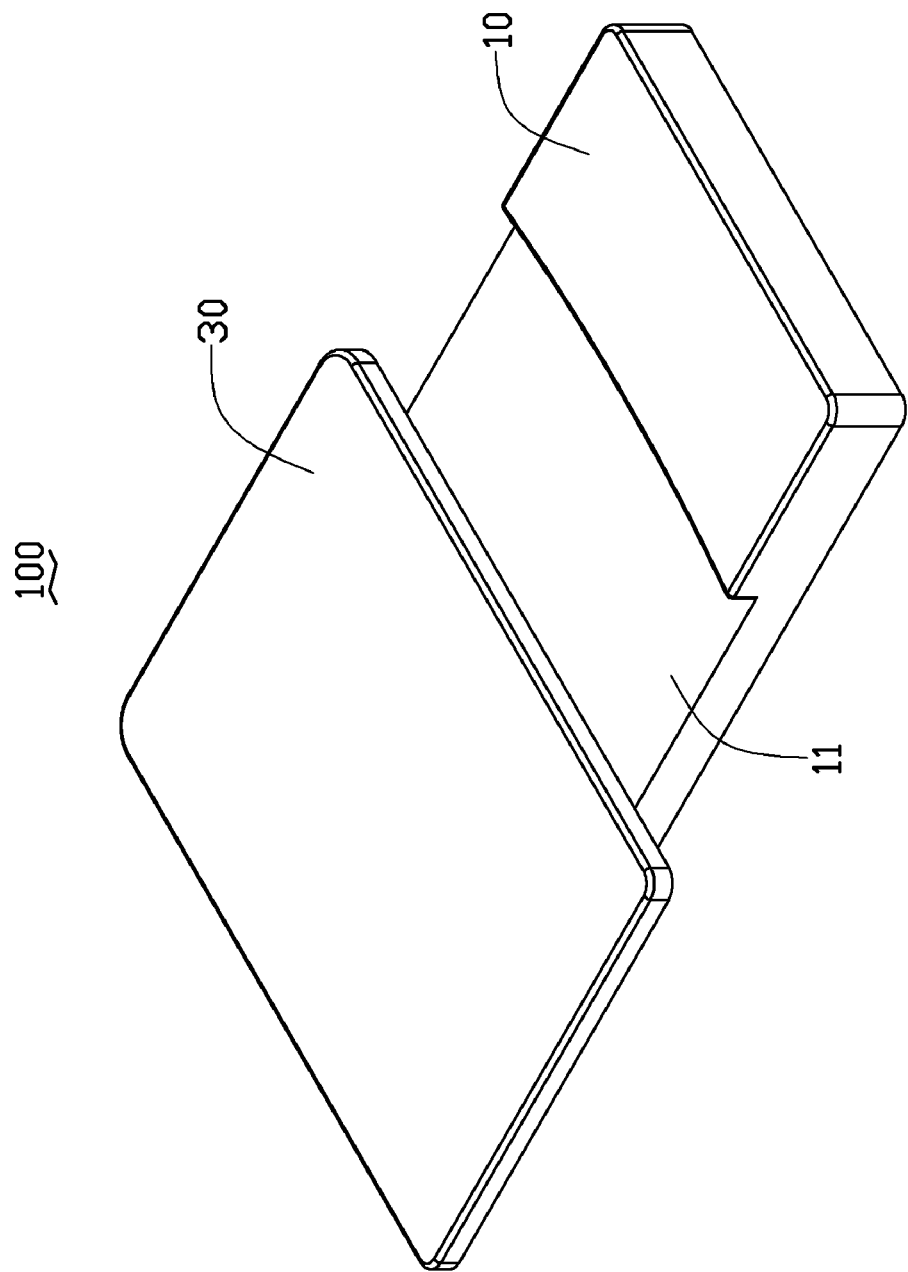
FIG. 8 is similar to FIG. 7, but showing the portable electronic in another state.

When the cover 30 is further rotated, the second post 523 slides beyond the middle of the receiving slot 531. Under the elastic force of the second elastic module 543, the second resisting element 57 pushes the second post 523 to automatically slide until the second post 523 reaches the other end of the receiving slot 531 and returns to the distal end of the guiding slot 511. As shown in FIG. 6, at the same time, the cover 30 rotates 90 degrees relative to the base 10 in the exemplary embodiment, as shown in FIG. 8. During the second post 523 slides, the connecting element 58 is moved by the second post 523 and is pushed by the first elastic module 541 to move away from the first post 521, at the same time, the end portion 561 of the first resisting element 56 is driven to rotate around the first post 521 by the connecting element 58.

The process of closing the cover 30 to the base 10 is substantially opposite to the process of opening described above, thus, the detailed description is omitted.

In the exemplary embodiment, the cover 30 can be rotated relative to the base 10 by the connecting assembly 50, the cover 30 can semi-automatically rotate during opened or closed. The adjusting mechanism 55 elastically resists the base 10 and the cover 30 when the cover 30 rotates relative to the base 10. When the cover 30 is adjusted relative to the base 10, the cover 30 resists the base 10, thus, the movement is smooth.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A portable electronic device comprising:
 a base;
 a cover;
 a first plate secured to the cover, a guiding slot and a receiving hole defined in the first plate;
 a second plate secured to the base, a receiving slot and a pin hole defined in the second plate;
 a first post passing through the pin hole and the receiving hole;
 a second post passing through the receiving slot and slidably received in the guiding slot; and
 an adjusting mechanism comprising a first resisting element, a second resisting element, and a connecting element, the first and second resisting elements slidably attached to opposite sides of the connecting element, one end of the adjusting mechanism rotatably connected to the first and second plates by the first post, and the other end of the adjusting mechanism slidably connected to the first and second plates by the second post.

2. The portable electronic device as claimed of claim 1, wherein the pin hole is co-linear with the guiding slot.

3. The portable electronic device as claimed of claim 1, wherein the pin hole and opposite ends of receiving slot are oriented at the vertices of an imaginary isosceles triangle.

4. The portable electronic device as claimed of claim 1, wherein the adjusting mechanism further comprises a first elastic module and a second elastic module, the first elastic is placed around the first resisting element and elastically resisting the connecting element, the second elastic module is placed around the second resisting element and elastically resisting the connecting element.

5. The portable electronic device as claimed of claim 4, wherein at least one guiding rod extends from the first and second resisting elements, at least one receiving groove is defined in opposite ends of the connecting element, in which the at least one guiding rod is received.

6. The portable electronic device as claimed of claim 1, wherein a plate portion extends from at opposite sides of the first resisting element at opposite ends, a guiding block projects from the corresponding plate portion, a receiving space and a sliding slot communicating with the receiving space are defined in opposite sides of the connecting element, the plate portions are slidably received in the corresponding sliding slots, and the plate portions are slidably received in the corresponding sliding slots.

7. A portable electronic device comprising:
a base;
a cover;
a first plate secured to the cover, a guiding slot and a receiving hole defined in the first plate;
a second plate secured to the base, a receiving slot and a pin hole defined in the second plate;
a first post passing through the pin hole and the receiving hole;
a second post passing through the receiving slot and slidably received in the guiding slot; and
an adjusting mechanism comprising a first resisting element, a second resisting element, and a connecting element, the first and second resisting elements slidably attached to opposite sides of the connecting element, the first post rotatably attached to one end of the adjusting mechanism and the second post rotatably attached to the other end of the adjusting mechanism, the adjusting mechanism allowing the cover to stay on the base when the cover is opened or closed.

8. The portable electronic device as claimed of claim 7, wherein the pin hole is co-linear with the guiding slot.

9. The portable electronic device as claimed of claim 7, wherein the pin hole and opposite ends of receiving slot are oriented at the vertices of an imaginary isosceles triangle.

10. The portable electronic device as claimed of claim 7, wherein the adjusting mechanism further comprises a first elastic module and a second elastic module, the first elastic is placed around the first resisting element and elastically resisting the connecting element, the second elastic module is placed around the second resisting element and elastically resisting the connecting element.

11. The portable electronic device as claimed of claim 10, wherein at least one guiding rod extends from the first and second resisting elements, at least one receiving groove is defined in opposite ends of the connecting element, in which the at least one guiding rod is received.

12. The portable electronic device as claimed of claim 7, wherein a plate portion extends from at opposite sides of the first resisting element at opposite ends, a guiding block projects from the corresponding plate portion, a receiving space and a sliding slot communicating with the receiving space are defined in opposite sides of the connecting element, the plate portions are slidably received in the corresponding sliding slots, and the plate portions are slidably received in the corresponding sliding slots.

13. A connecting assembly comprising:
a first plate defined a guiding slot and a receiving hole therein;
a second plate defining a receiving slot and a pin hole therein;
a first post passing through the pin hole and the receiving hole;
a second post passing through the receiving slot and slidably received in the guiding slot; and
an adjusting mechanism including a connecting element, a first elastic module and a first resisting element, the first elastic module placed around the first resisting element and elastically resisting a first side of the connecting element, the first post rotatably attached to one end of the adjusting mechanism and the second post rotatably attached to the other end of the adjusting mechanism, the adjusting mechanism producing a torsion for the base and the cover.

14. The connecting assembly as claimed of claim 13, wherein the pin hole is co-linear with the guiding slot, the pin hole and opposite ends of receiving slot are oriented at the vertices of an imaginary isosceles triangle.

15. The connecting assembly as claimed of claim 13, wherein the adjusting mechanism comprises a second resisting element, the second resisting element is slidably attached a second side of the connecting element opposite to the first side.

16. The connecting assembly as claimed of claim 15, wherein the adjusting mechanism further comprises a second elastic module, the second elastic module is placed around the second resisting element and elastically resisting the second side of the connecting element.

17. The connecting assembly as claimed of claim 16, wherein at least one guiding rod extends from the first and second resisting elements, at least one receiving groove is defined in opposite ends of the connecting element, in which the at least one guiding rod is received.

18. The connecting assembly as claimed of claim 15, wherein a plate portion extends from at opposite sides of the first resisting element at opposite ends, a guiding block projects from the corresponding plate portion, a receiving space and a sliding slot communicating with the receiving space are defined in opposite sides of the connecting element, the plate portions are slidably received in the corresponding sliding slots, and the plate portions are slidably received in the corresponding sliding slots.

* * * * *